United States Patent [19]
Kimura et al.

[11] Patent Number: 5,478,912
[45] Date of Patent: Dec. 26, 1995

[54] PROCESS FOR PRODUCING MODIFIED POLYAMINOAMIDE, MODIFIED POLYAMINOAMIDE PRODUCED THEREBY, AND EPOXY RESIN CURING AGENT COMPRISING THE SAID MODIFIED POLYAMINOAMIDE

[75] Inventors: Kazumasa Kimura, Nara; Takashi Kai, Toride; Hitoshi Yano, Suita; Ryuichi Ishikawa, Sakai; Kazuaki Abe; Yoshihiro Arita, both of Suita, all of Japan

[73] Assignee: Nippon Shokubai Co., Ltd., Osaka, Japan

[21] Appl. No.: 291,069

[22] Filed: Aug. 17, 1994

[30] Foreign Application Priority Data

Aug. 17, 1993 [JP] Japan ..................................... 5-203401
Aug. 17, 1993 [JP] Japan ..................................... 5-203402

[51] Int. Cl.$^6$ ................................................. C08G 69/26
[52] U.S. Cl. ........................ 528/340; 528/337; 528/332; 528/330; 525/423

[58] Field of Search ..................... 528/340, 337, 528/332, 330; 525/423

[56] References Cited

U.S. PATENT DOCUMENTS

| | | |
|---|---|---|
| 1,138,738 | 1/1969 | Reynolds . |
| 3,335,116 | 8/1967 | Rosenthal et al. . |
| 4,187,256 | 2/1980 | Jones et al. . |
| 5,214,124 | 5/1993 | Drawert et al. .......................... 528/340 |

*Primary Examiner*—James J. Seidleck
*Assistant Examiner*—Duc Truong
*Attorney, Agent, or Firm*—Oblon, Spivak, McClelland, Maier & Neustadt

[57] ABSTRACT

A process for producing a modified polyaminoamide with markedly increased reactivity as an epoxy resin curing agent is disclosed. The process comprises introducing amino groups and mercapto groups into a polyaminoamide by using an aziridine compound and a thiirane compound. The modified polyaminoamide is capable of curing an epoxy resin at a low temperature and at a high rate to provide a cured epoxy resin excellent in anticorrosion and chemical resistance.

21 Claims, 6 Drawing Sheets

PROCESS FOR PRODUCING MODIFIED POLYAMINOAMIDE, MODIFIED POLYAMINOAMIDE PRODUCED THEREBY, AND EPOXY RESIN CURING AGENT COMPRISING THE SAID MODIFIED POLYAMINOAMIDE

FIELD OF THE INVENTION

This invention relates to a process for producing a modified polyaminoamide and more particularly to process for producing a modified polyaminoamide having excellent curing properties, comprising introducing highly reactive amino group and mercapto group into a polyaminoamide molecule known as an epoxy resin curing agent. The modified polyaminoamide thus obtained is useful as an epoxy resin curing agent.

BACKGROUND OF THE INVENTION

A polyaminoamide is one of curing agents for epoxy resins and "polyaminoamide" is a general term for compounds which contain a plurality of active amino groups and at least one amide bond per molecule (according to "International Organization for Standardization"). A polyaminoamide is chiefly obtained by condensation between a polymeric fatty acid such as a dimeric acid or a trimeric acid and a polyamine compound such as polyethylene-polyamine. Since the polymeric fatty acid is a mixture comprising from 70 to 80% by weight of a dimer, from 15 to 25% by weight of a trimer and a tetramer, and not more than 10% by weight of a monomeric fatty acid, a variety of polyaminoamides are produced with variations of the kind or amount or the polyamine compound to be reacted with the polymeric fatty acid. Thus, the structural composition of polyaminoamides cannot be expressed in a simple manner.

The above-mentioned polyaminoamides are mainly employed as a cord-cure (i.e. at room temperature) type curing agent for epoxy resins. However, compared with polyamine compounds also used as an epoxy resin curing agent, the polyaminoamide is less reactive, with the number of amino groups being equal, because of the increased molecular weight due to the condensed polymeric fatty acid. As a result, it takes longer time for the former to achieve complete curing.

Where it is demanded to cure an epoxy resin at a higher rate or in a lower temperature, a polythiol compound is often employed as a curing agent. However, in order that a polythiol compound may exhibit rapid curing properties or cold curing properties, a basic compound must be used in combination as a curing accelerator. Additionally, most of the currently employed polythiol compounds are polythioalkylcarboxylates obtained by the reaction between a thioalkylcarboxylic acid and a polyhydric alcohol, and the presence of an ester bond in the resulting molecule makes such polythiol compounds inferior in chemical resistance, particularly alkali resistance. Therefore, epoxy resins cured by the use of the polythioalkylcarboxylates are not allowed to be used in applications involving contact with an alkali.

Further, the polythioalkylcarboxylates form hydrogen sulfide gas on epoxy resin curing reaction, resulting in not only deterioration of the working environment but entrapment of gas bubbles and corrosion. Use of them has therefore been limited.

SUMMARY OF THE INVENTION

The present invention is to solve the problems associated with the above-described conventional epoxy resin curing agents.

That is, an object of the present invention is to provide an industrially advantageous process for introducing amino groups and mercapto groups into a polyaminoamide molecule.

Another object of the present invention is to provide a modified polyaminoamide comprising a polyaminoamide having a relatively low curing rate, highly reactive amino groups and mercapto groups being incorporated thereinto.

A further object of the present invention is to provide an epoxy resin curing agent which has excellent cold and fast curing characteristics and provides a cured epoxy resin excellent in anticorrosion and chemical resistance, particularly alkali resistance.

The present invention relates to a process for producing a modified polyaminoamide comprising reacting (1) a polyaminoamide, (2) an aziridine compound represented by formula (I):

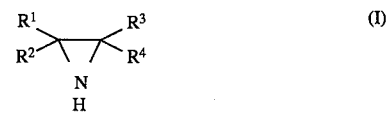

wherein $R^1$, $R^2$, $R^3$, and $R^4$, which may be the same or different, each represent a hydrogen atom or an alkyl group having from 1 to 4 carbon atoms, and (3) a thiirane compound represented by formula (II):

wherein $R^5$, $R^6$, $R^7$, and $R^8$, which may be the same or different, each represent a hydrogen atom, an alkyl group having from 1 to 4 carbon atoms or an aryl group.

In a preferred embodiment of the above process, aziridine compound (2) and thiirane compound (3) are first reacted to once obtain a reaction product (A), which is then reacted with polyaminoamide (1).

In another preferred embodiment of the above process, a part or the whole of polyaminoamide (1) is charged in a reaction vessel, and the remaining starting materials are added thereto in an arbitrary order at an arbitrary stage.

The present invention further includes a process for producing a modified polyaminoamide comprising reacting a polyaminoamide (1) with a 1-(2-mercaptoethyl)aziridine compound represented by formula (III):

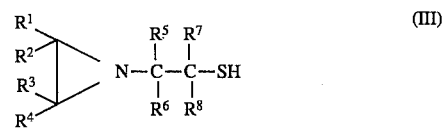

wherein $R^1$, $R^2$, $R^3$, $R^4$, $R^5$, $R^6$, $R^7$, and $R^8$ are same as defined above.

According to the process of the present invention, amino groups and mercapto groups can easily be introduced into the polyaminoamide molecule, thereby achieving satisfactory efficiency on an industrial scale.

The present invention furthermore relates to the thus obtained modified polyaminoamide and an epoxy resin curing agent comprising the modified polyaminoamide.

DETAILED DESCRIPTION OF THE INVENTION

Figure 1:
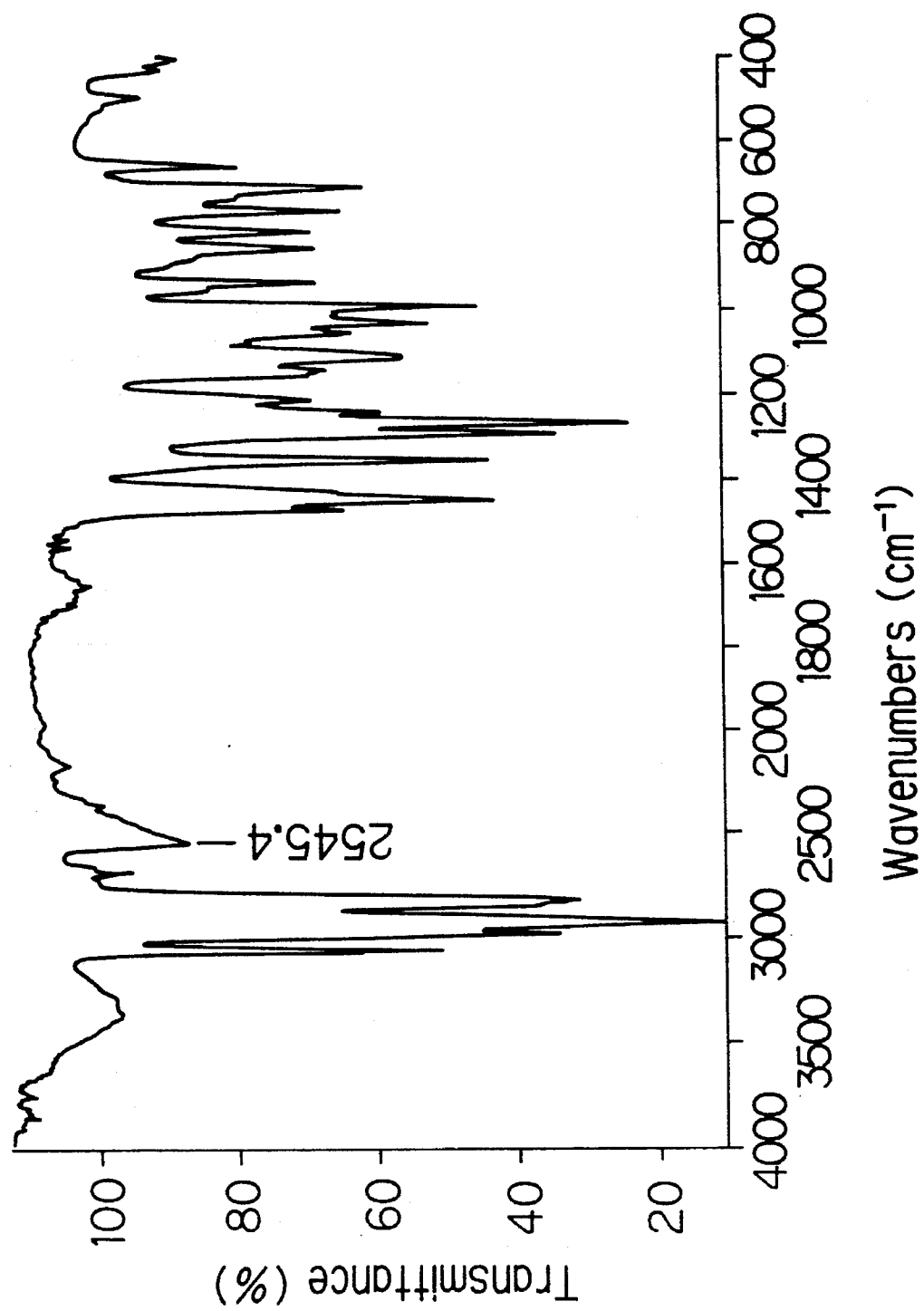
FIG. 1 is an infrared absorption spectrum of a reaction product obtained in Example 1.

The novelty of the process according to the present invention consists in introduction of highly reactive amino groups and mercapto groups into polyaminoamide (1) by modification with aziridine compound (2) and thiirane compound (3). Introduction of amino groups and mercapto groups can also be accomplished by reacting polyaminoamide (1) with 1-(2-mercaptoethyl)aziridine compound which is a main product of the reaction between aziridine compound (2) and thiirane compound (3).

As previously stated, the "polyaminoamide", one of the starting materials used in the present invention, is a general term for an epoxy resin curing agent having a plurality of active amino groups and at least one amide group per molecule. It is generally obtained by condensation of a polycarboxylic acid compound and a polyamine compound. For production on an industrial scale, the condensation reaction is usually conducted using, as a polycarboxylic acid compound, a polymeric fatty acid comprising a dimeric acid, a trimeric acid, etc. obtained by polymerization of a fatty acid having an unsaturated bond therein, such as linolenic acid, linoleic acid, oleic acid, elaidic acid or ricinolic acid. Since a commercially available polymeric fatty acid is a mixture comprising from 70 to 80% by weight of a dimer, from 15 to 25% by weight of a trimer and a tetramer, and not more than 10% by weight of a monomeric fatty acid, the structural composition of the resulting polyaminoamide is subject to wide variation with variations of the kind or amount of the other reactant, the polyamine compound, and thus cannot be expressed in a simple manner.

The polyamine compound to be reacted with the polymeric fatty acid is not particularly limited as long as it has at least two amino groups having active hydrogen per molecule. Specific examples of suitable polyamine compounds include aliphatic diamines, such as ethylenediamine, hexamethylenediamine, and piperazine; polyethylene-polyamines, such as diethylenetriamine, triethylenetetramine, tetraethylenepentamine, and pentaethylenehexamine; polyalkylene-imines obtained by ring-opening polymerization of alkylene-imines, such as ethyleneimine; and aromatic polyamines, such as xylylenediamine and diaminodiphenyl-methane. These polyamine compounds may be used either individually or in combination of two or more thereof.

While the polyaminoamide can be prepared from the polymeric fatty acid and the polyamine compound, each selected appropriately from among the above-described compounds, by dehydration under heating, it is possible to use a commercially available polyaminoamide. Examples of commercially available polyaminoamides include a series of "Epomik®" produced by Mitsui Petrochemical Industries, Ltd. (e.g., Epomik Q-651, Q- 652, Q-654, and Q-655); a series of "Daito Curar®" produced by Daito Sangyo Co., Ltd. (e.g., Daito Curar P-1043, P-4115, P- 4250, and P-4730); a series of "Goodmide®" produced by Tohto Kasei Co., Ltd. (e.g., Goodmide G-700, G-715, G-715B, G-720, G-725, G-730, G-740A, G-623, G-624, G-625A, G-645, and G-535); a series of "Sumicure®" produced by Sumitomo Chemical Co., Ltd. (e.g., Sumicure P-245, P-250, P-290C, P-624, P-625, P-715B, P-740A, and FH-10); and a series of "Adeka Hardener®" produced by Asahi Denka Kogyo K.K. (e.g., Adeka Hardener EH-203, EH-204 R, EH-206, EH-207, EH-209, and EH-335).

"Aziridine compound" (2), which can be used for modifying the polyaminoamide, is a general term for amine compounds having a 3-membered ring structure as represented by formula (I):

wherein $R^1$, $R^2$, $R^3$, and $R^4$ are as defined above.

Specific examples of the aziridine compound of formula (I) which can preferably be used in the present invention are aziridine, 2-methylaziridine, 2-ethylaziridine, 2,2- or 2,3-dimethylaziridine, 2-methyl-3-ethylaziridine, and 2,2- or 2,3-diethylaziridine, and aziridine industrially available is especially preferred.

"Thiirane compound" (3), which is also used for modifying the polyaminoamide, is a general term for sulfide compounds having a 3-membered ring structure as represented by formula (II):

wherein $R^5$, $R^6$, $R^7$, and $R^8$ are same as defined above.

Specific examples of the thiirane compound of formula (II) are thiirane, 2-methylthiirane, 2-ethylthiirane, 2,2- or 2,3-dimethylthiirane, 2-methyl-3-ethylthiirane, 2,2- or 2,3-diethylthiirane, and 2-phenylthiirane. Preferred ones of them are thiirane and 2-methylthiirane for their availability and low boiling point.

In the present invention, the three starting materials, i.e., polyaminoamide (1), aziridine compound (2), and thiirane compound (3), are reacted to introduce amino groups and mercapto groups into polyaminoamide (1). The reaction proceeds as follows in its simplest mechanism. Instead of the active hydrogen bonded to the nitrogen atom of aziridine compound (2), a ring-opened thiirane compound (3) is added to form a 1-(2-mercaptoethyl)aziridine compound, which is then reacted with the amino group in polyaminoamide (1), and thereafter mercapto groups and amino groups of the 1-(2-mercaptoethyl)aziridine compound are introduced into the polyaminoamide. It seems that the above reaction mechanism is based on the fact that the reaction between aziridine compound (2) and thiirane compound (3) proceeds faster than the reaction of aziridine compound (2) or thiirane compound (3) with polyaminoamide (1).

It is considered that the above reaction is accompanied with side reactions of producing a homopolymer of the thiirane compound, a homopolymer of the aziridine compound, a polymer of a 1-(2-mercaptoethyl)aziridine compound (i.e., a copolymer of the aziridine compound and the thiirane compound), and the like. There are various courses these by-products may follow. For example, they may remain in the reaction mixture, they may be introduced into the polyaminoamide, or they may react one another and further react with the polyaminoamide.

While such side reactions may take place in reaction modes A to C hereinafter described, the reaction of the by-product(s) with the polyaminoamide gives rise to no problem because the chief aim of the present invention resides in modification of the polyaminoamide. For the time being, while the amounts of the by-products remaining by themselves in the reaction mixture cannot be specified clearly, the finally obtained reaction product among the three starting materials, polyaminoamide, aziridine compound and thiirane compound, can be used as an epoxy resin curing agent as it is.

The reaction of the present invention can be carried out in accordance with any of the following reaction modes. The term "to add" as used herein inclusively means "to add dropwise", "to add in several divided portions", and "to add all at once".

Mode A: Polyaminoamide (1), aziridine compound (2) and thiirane compound (3) are added to a reaction vessel.

Mode B: A part or the whole of polyaminoamide (1) is added to a reaction vessel. Aziridine compound (2), thiirane compound (3), and residual polyaminoamide (1) if any are then added thereto. The order and stage of addition are not particularly restricted. It is recommended, however, that aziridine compound (2) be added before thiirane compound (3) because, in this case, it is more likely that the aziridine ring is first opened and added to the amino group of the polyaminoamide, and the thiirane ring is then opened and added to the amino group resulting from the ring-opening of the aziridine ring.

Mode C: Aziridine compound (2) and thiirane compound (3) are first reacted to once obtain reaction product (A), which is then added to polyaminoamide (1). The reaction product (A) may be put into a reaction vessel containing polyaminoamide (1), or polyaminoamide (1) may be put into a reaction vessel where the first reaction was conducted to obtain the reaction product (A).

Mode D: A 1-(2-mercaptoethyl)aziridine compound is isolated from the reaction product (A) between aziridine compound (2) and thiirane compound (3), and then the 1-( 2-mercaptoethyl)aziridine compound is added to polyaminoamide (1).

Modes A and B are industrially advantageous in that the desired reaction can be effected efficiently through one step. Mode C achieves an increased probability of the reaction between polyaminoamide (1) and the 1-(2-mercaptoethyl)aziridine compound. Mode D assures the highest probability of that reaction. Therefore, mode D is preferred where the molecule of a modified polyaminoamide should be designed precisely.

The above reaction can be preferably carried out without a solvent or with an inactive organic solvent to the aziridine compound and thiirane compound. Examples of suitable inactive organic solvents include aromatic hydrocarbons, such as benzene, toluene, and xylene; aliphatic hydrocarbons, such as pentane, hexane, heptane, and octane; alicyclic hydrocarbons, such as cyclopentane, cyclohexane, and cycloheptane; and ether compounds, such as diethyl ether, tetrahydrofuran and 1,4-dioxane. While not especially limited, a suitable reaction temperature is from room temperature to 150° C.

In the case where aziridine compound (2) and thiirane compound (3) are previously reacted to obtain reaction product (A), this reaction is preferably performed in the above-mentioned inactive organic solvent. No catalyst is necessary in the reaction. Reaction product (A) having a number average molecular weight of from 103 to 300 is preferred for its satisfactory reactivity with the polyaminoamide. On reacting aziridine and thiirane, for example, at an equimolar ratio, there is obtained 1-(2-mercaptoethyl)aziridine. Having a low molecular weight, this compound is the most efficient for introducing an amino group and a mercapto group into a polyaminoamide. Reaction product (A) thus obtained is brought into reaction with a polyaminoamide either as dissolved or after organic solvent removal. The 1-(2-mercaptoethyl)aziridine compound to be used in mode D is isolated from reaction product (A) by distillation.

Where a polyaminoamide is reacted with a 1-( 2-mercaptoethyl)aziridine compound, reaction product (A) between the aziridine compound and the thiirane compound, or any other by-products, it is preferable to use an acid catalyst. Examples of useful acid catalysts include sulfonic acids, e.g., p-toluenesulfonic acid and methanesulfonic acid, and inorganic acids, e.g., sulfuric acid, hydrochloric acid, and nitric acid. The acid catalyst is previously mixed with a polyaminoamide or added to the reaction vessel in an appropriate stage.

The aziridine compound and the thiirane compound are each preferably used in an amount of from 0.01 to 10 molar equivalents, with the upper limit of the total amount of the aziridine compound and the thiirane compound being 10 equivalents, per equivalent of active hydrogen of the polyaminoamide. Where the aziridine compound and the thiirane compound are previously reacted, and the resulting reaction product (A) is reacted with the polyaminoamide, reaction product (A) is preferably used in an amount of from 0.01 to 10 molar equivalents per equivalent of active hydrogen of the polyaminoamide. If the amount of each reactant to be reacted with a polyaminoamide is less than 0.01 molar equivalent per equivalent of active hydrogen, the absolute amount of amino groups or mercapto groups in the resulting modified polyaminoamide would be too small to manifest the effects of modification, i.e., the performance of the resulting modified polyaminoamide as an epoxy resin curing agent would be substantially equal to that of the unmodified polyaminoamide. On the other hand, even if each reactant is added in an amount exceeding 10 times the equivalent of active hydrogen of a polyaminoamide, taking a loss into account, such merely involves waste in terms of stoichiometry. This is why the upper limit of each reactant is set at 10 molar equivalents. The thiirane compound is usually used in an amount of from 0.1 to 10 moles per mole of the aziridine compound. The finally obtained modified polyaminoamide preferably has a number average molecular weight of from 200 to 100,000.

The above-described process according to the present invention consists of a liquid phase reaction easy to control. Besides, since the process is chiefly based on the ring-opening addition reaction of an aziridine ring onto the amino group of the polyaminoamide, involvement of by-production of sulfur-containing compounds having an offensive odor is reduced. Therefore, the process is very useful for introduction of the mercapto group into the polyaminoamide. Further, since the resulting modified polyaminoamide is applicable as such as an epoxy resin curing agent, a modified polyaminoamide can be produced with no need of treatment of waste, waste water, etc., which leads to great advantages from the standpoint of both environmental protection and industrial efficiency.

The modified polyaminoamide obtained by the above-described process and an epoxy resin curing agent comprising the same are also included under the scope of the present invention. The modified polyaminoamide according to the present invention exhibits excellent cold- and fast-curing characteristics to provide a cured epoxy resin having satisfactory alkali resistance and is therefore excellent as an epoxy resin curing agent. Epoxy resins to which the epoxy resin curing agent of the present invention is applicable is not particularly limited as far as they have two or more epoxy groups per molecule. Examples of the epoxy resins include bisphenol A epoxy resins, bisphenol F epoxy resins, hydrogenated bisphenol A epoxy resins, phenol-novolak epoxy resins, cresol-novolak epoxy resins, glycidyl ether epoxy resins, glycidyl ester epoxy resins, glycidylamine epoxy resins, alicyclic epoxy resins containing epoxy cyclohexyl groups and mixtures of two or more thereof.

The amount of the modified polyaminoamide to be used to an epoxy resin is decided appropriately according to the epoxy equivalent of the epoxy resin to be cured and the amount of active hydrogen in the modified polyaminoamide. In general, it is used in an amount ranging from 0.1 to 2,000 parts by weight, preferably from 1 to 300 parts by weight, per 100 parts by weight of an epoxy resin. If desired, the modified polyaminoamide of the present invention may be used in combination with known other epoxy resin curing agents. For example, one or more kinds of Lewis bases, such as tertiary amines, may be used in combination.

The present invention will now be illustrated in greater detail with reference to Examples, but it should be understood that the present invention is not construed as being limited thereto.

EXAMPLE 1

(Modifing of polyaminoamide by Mode C)

In a flask equipped with a stirrer, a thermometer, and a reflux condenser, were charged 170.7 g of aziridine and 250 g of cyclohexane and mixed under nitrogen. To the mixture, was added 238.3 g of thiirane all at once. Thereafter the mixture was slowly heated up to the refluxing temperature, at which the mixture was allowed to react for 4 hours. After completion of the reaction, the solvent was removed under reduced pressure to obtain 398.1 g of a clear liquid reaction product (designated (A-1)). The infrared (IR) absorption spectrum of the reaction product (A-1) is shown in FIG. 1. The spectrum showed an absorption at 2545 cm$^{-1}$ assigned to a mercapto group (—SH) with no substantial absorption assigned to an amino group (—NH) at around 3300 cm$^{-1}$. It is thus recognized that reaction product (A-1) mainly comprised 1-(2-mercaptoethyl)aziridine.

Figure 2:
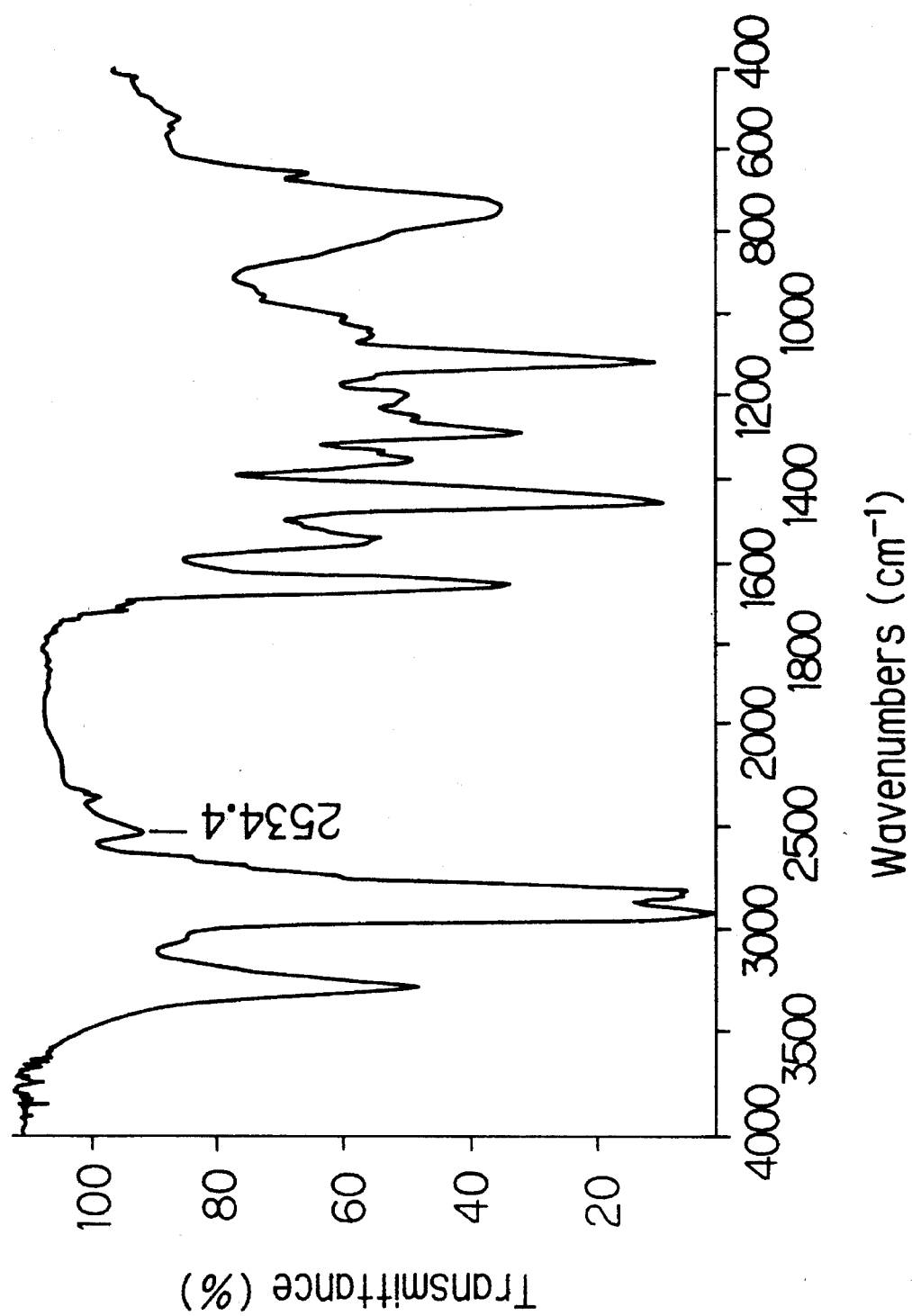
FIG. 2 is an infrared absorption spectrum of a modified polyaminoamide obtained in Example 1.

In a separate flask equipped with a stirrer, a thermometer, and a reflux condenser were charged 300 g of reaction product (A-1) and 250 g of "Epomik® Q-654" (a dimeric acid-polyalkylene polyamine-based polyaminoamide produced by Mitsui Petrochemical Industries, Ltd.) and mixed under nitrogen. To the mixture was added 1.30 g of methanesulfonic acid, and the mixture was allowed to react at 70° C. for 6 hours to obtain 549 g of a modified polyaminoamide (1) as an opaque brown viscous substance. The IR spectrum of modified polyaminoamide (1) is shown in FIG. 2. An absorption assigned to a mercapto group (—SH) was observed at 2534 cm$^{-1}$ leading confirmation to introduction of mercapto groups.

EXAMPLE 2

(Modifing of polyaminoamide by Mode C)

Figure 3:
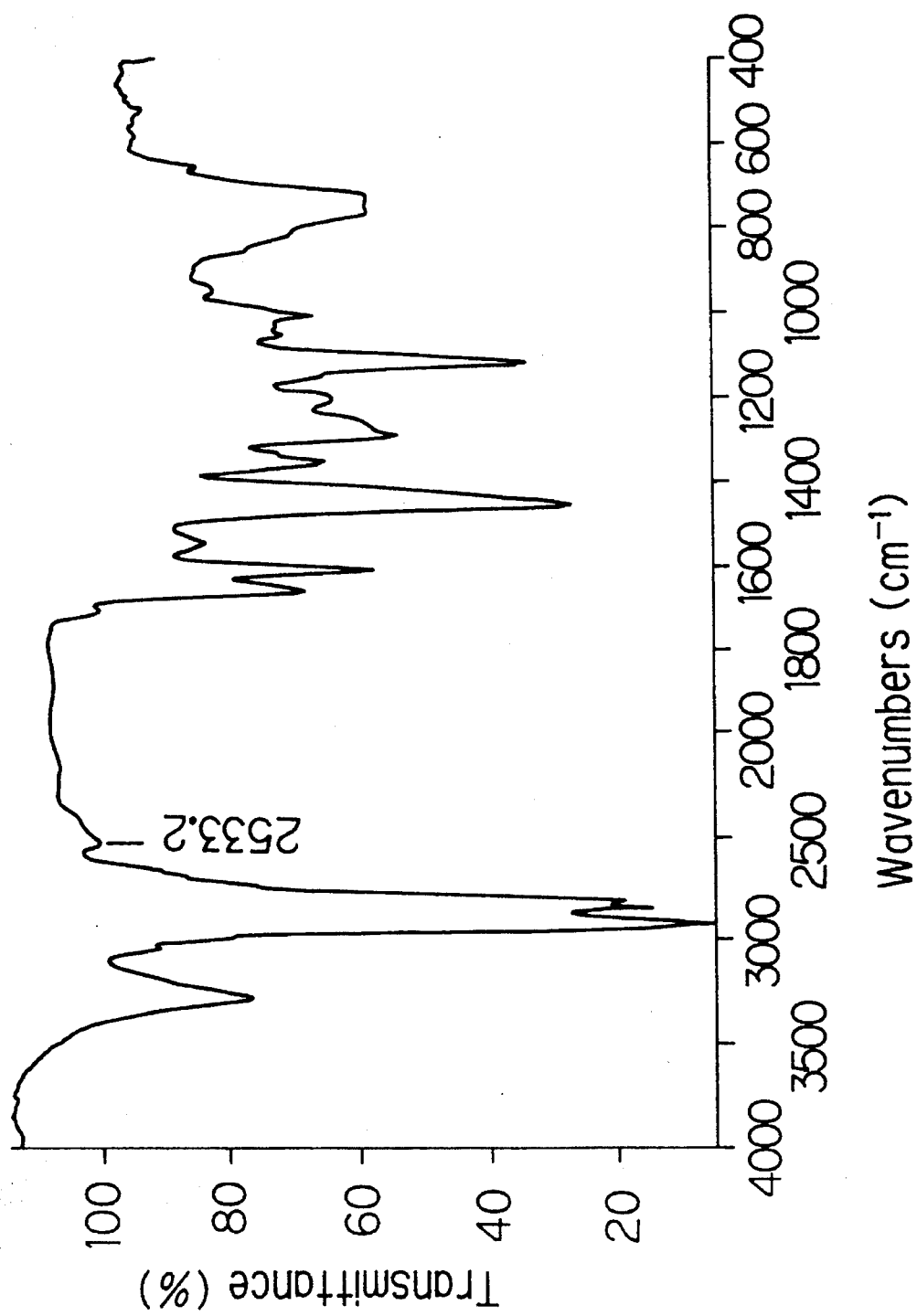
FIG. 3 is an infrared absorption spectrum of a modified polyaminoamide obtained in Example 2.

In the same manner as in Example 1, 299 g of an opaque brown viscous modified polyaminoamide (2) was obtained, except for replacing 250 g of Epomik® Q-654 with 200 g of "Adeka Hardener® EH-335" (a dimeric acid-polyalkylene polyamine-based polyaminoamide produced by Asahi Denka Kogyo K.K.) and changing the amount of reaction product (A-1) to 100 g. The IR spectrum of modified polyaminoamide (2) is shown in FIG. 3. Introduction of mercapto groups was confirmed by the absorption at 2533 cm$^{-1}$ due to a mercapto group (—SH).

EXAMPLE 3

(Modifining of polyaminoamide by Mode D)

Figure 4:
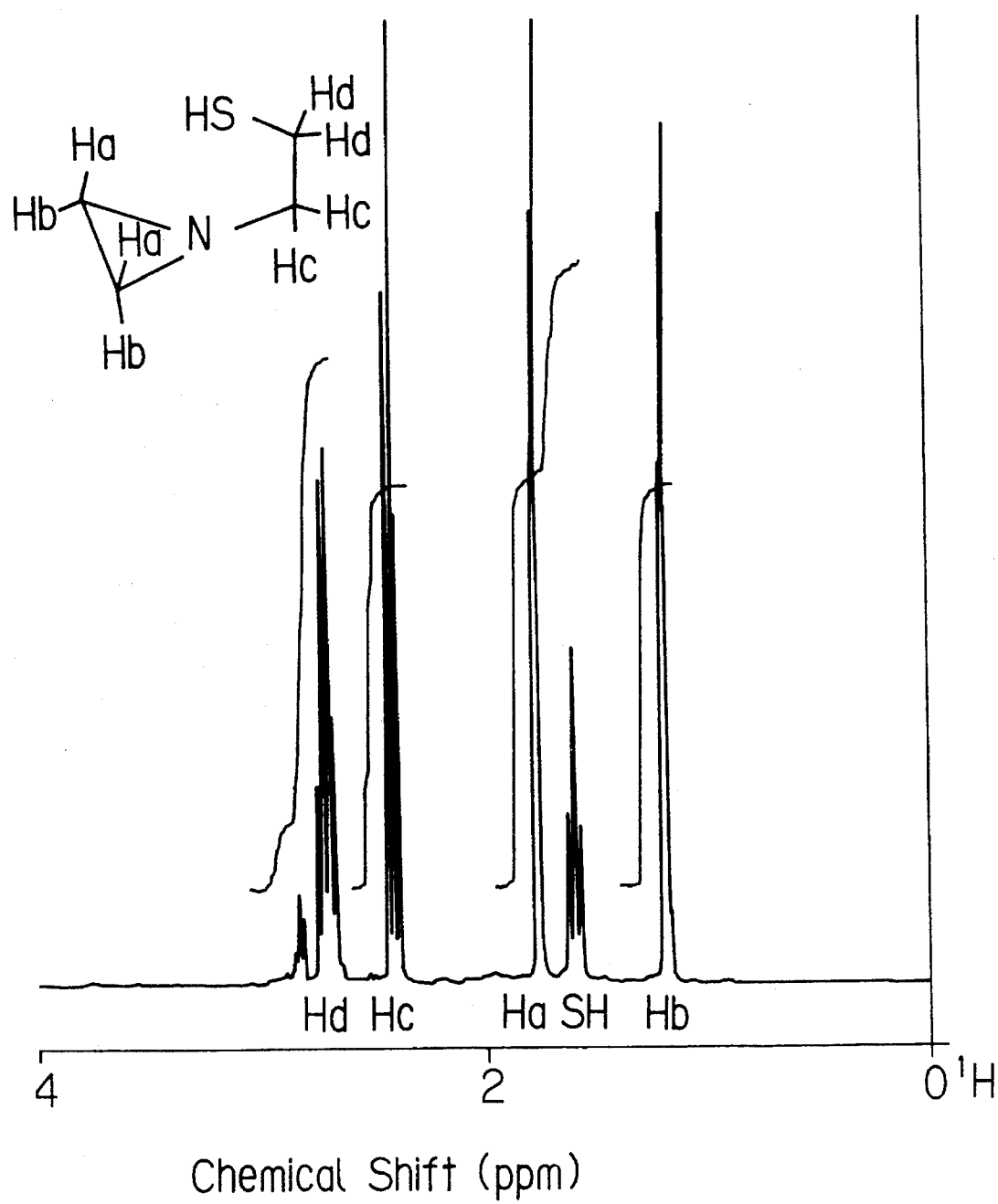
FIG. 4 is a $H^1$-NMR spectrum of a reaction product obtained in Example 3.

In a flask equipped with a stirrer, a thermometer and a reflux condenser, were charged 550.9 g of n-hexane and was slowly heated to 50° C. under nitrogen. To the flask, was simultaneously dropped 357.5 g of aziridine and 499.0 g of thiirane over a 3 hours period, and was allowed to react at 50°–58° C. After dropping, the mixture was reacted at the same temperature for 3 hours. And after completion of the reaction, the solvent was removed under reduced pressure. From thus obtained 307.6 g of a pure products, clear liquid reaction product (designated (A-2)), was isolated under reduced pressure. The H$^1$-NMR spectrum of the reaction product (A-2) is shown in FIG. 4. The spectrum showed that the reaction product (A-2) was 1-(2-mercaptoethyl)aziridine. Purity of the reaction product (A-2) was 93.4% and isolation rate thereof was 33.5%.

Figure 5:
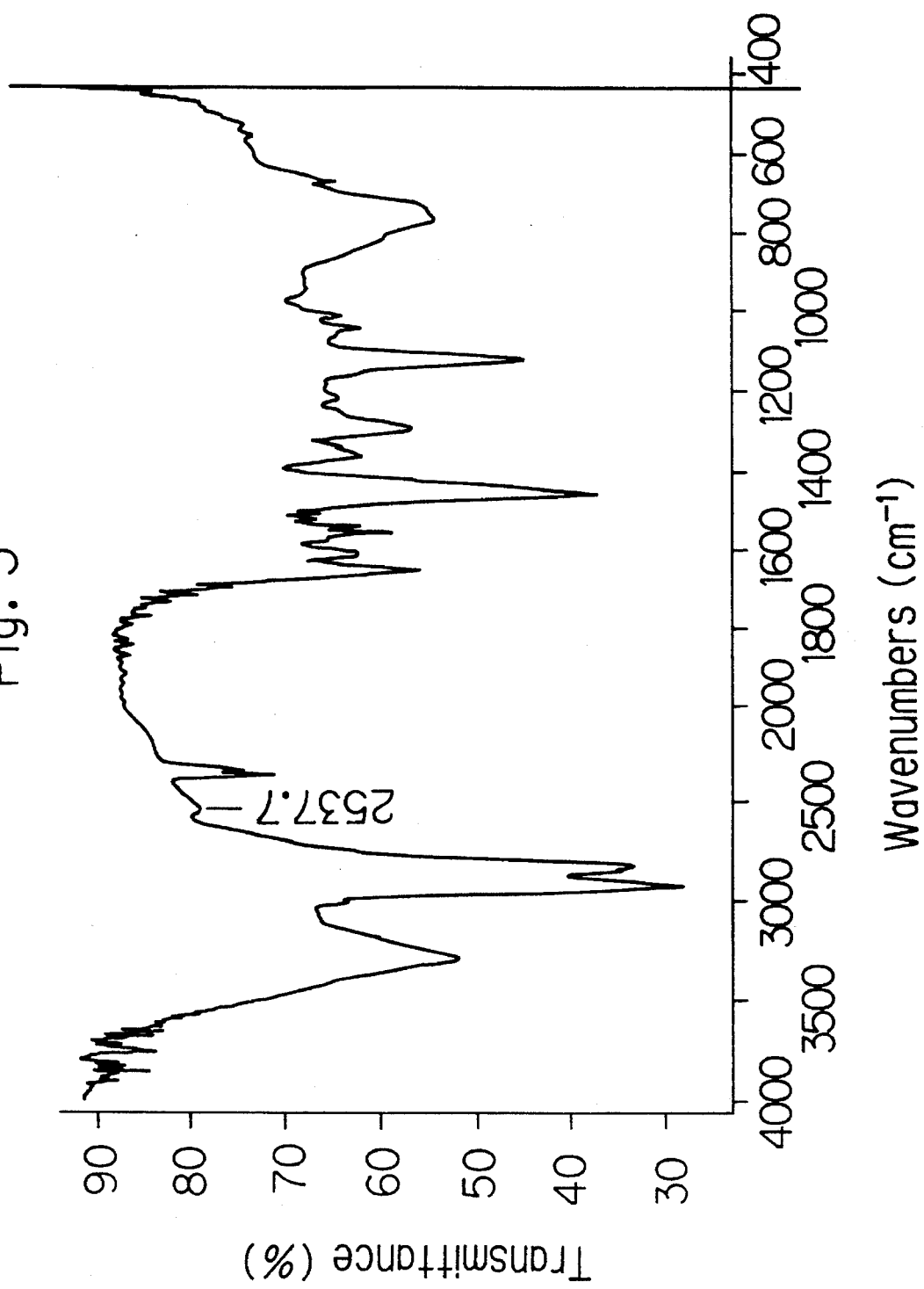
FIG. 5 is an infrared absorption spectrum of a modified polyaminoamide obtained in Example 3.

In a separate flask equipped with a stirrer, a thermometer and a reflux condenser, were charged 54.7 g of "Epomik® Q-655" (a dimeric acid-polyalkylene polyamine-based polyaminoamide produced by Mitsui Petrochemical Industries, Ltd.) and 76.4 g of 1,4-dioxane and mixed under nitrogen. To the mixture, was added 1.95 g of methanesulfonic acid, and the mixture was heated up to 70° C. To the mixture, was added 60.1 g of reaction product (A-2) and allowed to react at 70° C. for 6 hours, at 80 ° C. for 10 hours and at 90° C. for 4 hours. After completion of the rection, the solvent was removed under reduced pressure and thereafter, was obtained 112.1 g of a modified polyaminoamide (3) as a clear brown viscous substance. The IR spectrum of modified polyaminoamide (3) is shown in FIG. 5. An absorption assigned to a mercapto group (—SH) was observed at 2538 cm$^{-1}$, leading confirmation to introduction of mercapto groups.

EXAMPLE 4

(Modifining of polyaminoamide by Mode B)

Figure 6:
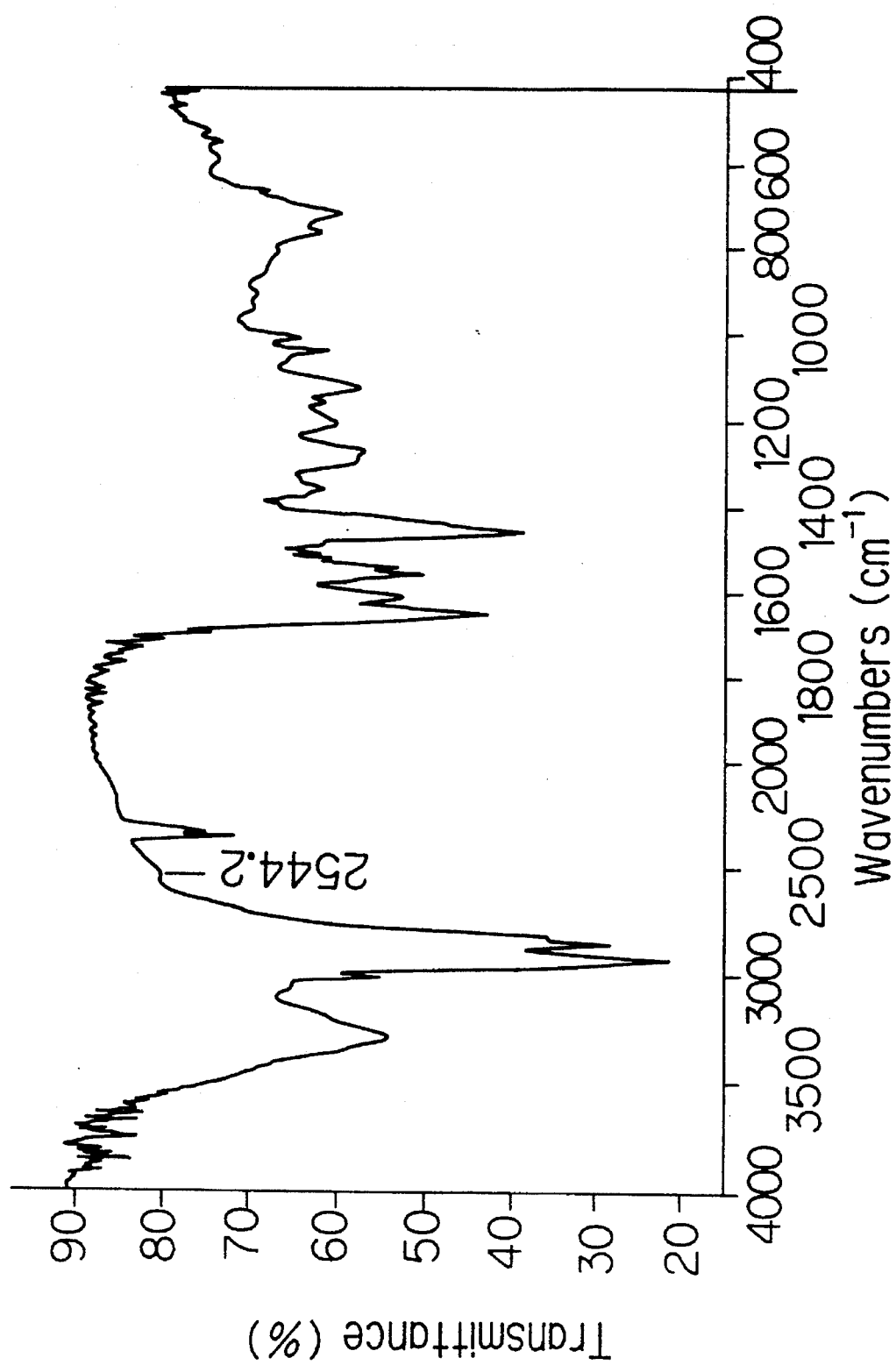
FIG. 6 is an infrared absorption spectrum of a modified polyaminoamide obtained in Example 4.

In a flask equipped with a stirrer, a thermometer, and a reflux condenser were charged 100.1 g of "Epomik® Q-655" (a dimeric acid-polyalkylene polyamine-based polyaminoamide produced by Mitsui Petrochemical Industries, Ltd.) and 122.8 g of 1,4-dioxane and mixed under nitrogen. After addition of 1.95 g of methanesulfonic acid, the mixture was heated up to 100°– 110° C. To the mixture, was dropped simultaneously 21.6 g of aziridine and 30.1 g of thiirane over a 2.5 hours period. After dropping, the mixture was reacted for 5.5 hours further. After completion of the reaction, the solvent was removed under reduced pressure and thereafter, was obtained 151.8 g of a modified polyaminoamide (4) as an opaque brown viscous substance. The IR spectrum of modified polyaminoamide (4) is shown in FIG. 6. An absorption assigned to a mercapto group (—SH) was observed at 2544 cm$^{-1}$, leading confirmation to introduction of mercapto groups.

EXAMPLE 5

Modified polyaminoamides (1),(2),(3) and (4) obtained in Examples 1–4 were compared with the respective unmodified polyaminoamide in terms of performance as an epoxy resin curing agent. For further comparison, trimethylolpropanetris( 3-mercaptopropionate) was also tested as a comparative curing agent in Run Nos. 8 and 9. An epoxy resin "ELA 128" (produced by Sumitomo Chemical Co., Ltd.; epoxy equivalent: 190) was used. Each of the curing agents shown in Table 1 below was added to the epoxy resin in an amount shown. 2,4,6-tris(dimethylaminomethyl)phenol was also added as a curing accelerator only in Run No. 9. Run Nos. 1–4 are in accord with the present invention.

The performance characteristics of the epoxy resin curing agent were evaluated according to the following test methods. The results obtained thereby are shown in Table 1.

Cold-Curing Characteristics:

A prescribed amount of a curing agent, shown in Table 1, was added to the epoxy resin having been conditioned at 5° C. overnight. After mixing for 1 minute, the mixture was applied to a glass plate to a thickness of about 80 μm to prepare a test piece. Immediately after the preparation, each test piece was mounted on a drying recorder (manufactured by Taiyu Kizai K.K.) set at 5° C., and the uncured film was continuously scratched with a stylus. The time required until the stylus made no scratch any more was taken as a curing time at 5° C. and thus the curing time at 5° C. was estimated.

Good . . . No rust formed at all.

Medium . . . Slight rust formed after 7 days.

Poor . . . Rust formed in one day.

Chemical Resistance:

A test was conducted in accordance with JIS K7114. A prescribed amount of a curing agent, shown in Table 1, was added to the epoxy resin at room temperature. After mixing for 1 minute, the mixture was molded into a disc test piece of 50 mm in diameter and 3 mm in thickness. The test piece was thoroughly soaked in each of the test liquids shown in Table 1 and left at room temperature for 7 days. The test piece was taken out of the liquid, lightly wiped dry, and weighed. The change in weight between before and after the soaking was taken as an indication of degree of swelling and rated as follows.

Good . . . No swelling was observed.

Medium . . . The test piece was slightly swollen.

Poor . . . The test piece was considerably swollen.

Very poor . . . The test piece was swollen to dissolve.

TABLE 1

| Run Nos. | No. 1 | No. 2 | No. 3 | No. 4 | No. 5 | No. 6 | No. 7 | No. 8 | No. 9 |
| --- | --- | --- | --- | --- | --- | --- | --- | --- | --- |
| Epoxy Resin (part by wt.) | 100 | 100 | 100 | 100 | 100 | 100 | 100 | 100 | 100 |
| Curing Agent (part by wt.) | | | | | | | | | |
| Modified polyaminoamide (1) | 75 | | | | | | | | |
| Modified polyaminoamide (2) | | 72 | | | | | | | |
| Modified polyaminoamide (3) | | | 56 | | | | | | |
| Modified polyaminoamide (4) | | | | 89 | | | | | |
| Epomic ○ Q-654 | | | | | 53 | | | | |
| Adeka Hardener ○ EH-335 | | | | | | 60 | | | |
| Epomic ○ Q-655 | | | | | | | 53 | | |
| Trimethylolpropane tris-(3-mercaptopropionate) | | | | | | | | 70 | 70 |
| Curing Accelerator (part by wt.) | — | — | — | — | — | — | — | — | 14 |
| Cold-Curing Characteristics (hrs.) | 8 | 20 | 18 | 18 | >48 | >48 | >48 | uncured | 1 |
| Anticorrosion | good | good | good | good | very poor | very poor | very poor | — | medium |
| Chemical Resistance | | | | | | | | | |
| 10% NaOH aqueous solution | good | good | good | good | good | good | good | — | very poor |
| 10% HCl aqueous solution | good | good | good | medium | medium | medium | medium | — | medium |
| 10% $H_2SO_4$ aqueous solution | medium | medium | medium | medium | poor | poor | medium | — | poor |
| Deionized water | good | good | good | good | medium | medium | medium | — | medium |

The longer the time, the poorer the cold-curing characteristics.

Anticorrosion:

A prescribed amount of a curing agent, shown in Table 1, was added to the epoxy resin at room temperature. The mixture was mixed for 1 minute, and immediately thereafter the mixture was applied thinly to a dull steel plate and allowed to stand at room temperature for 7 days to completely cure. The cured film was crosscut in a diagonal direction with a knife, and a 5% aqueous solution of sodium chloride was sprayed thereon for consecutive 7 days. The anticorrosion was evaluated according to the following standard.

As obviously shown in Table 1, the examples in this invention have excellent cold- and fast-curing characteristics and cured characteristics. On the other hand, in Run Nos. 5–7, using unmodified polyaminoamide as a curing agent, it took more than 48 hours to complete curing at 5° C. and additionally anticorrosion of each example was inferior. In Run No. 8, Trimethylolpropane tris(3-mercaptopropionate), which is one of polymercapto compounds, was singly used as a curing agent, there was no curing appeared. In Run No. 9, using Trimethylolpropane tris( 3-mercaptopropionate) and a curing accelerator, though curing was completed very fast, anticorrosion and chemical resistance such as alkali-resistance were greatly inferior.

As is obvious from the foregoing Examples, the process according to the present invention makes it possible to introduce amino groups and mercapto groups into a polyaminoamide with ease. The resulting modified polyaminoamide is capable of curing an epoxy resin at a low temperature and at a high rate without the aid of a curing accelerator. The thus cured epoxy resin is excellent in anticorrosion and chemical resistance.

The process of the present invention consists of a liquid phase reaction easy to control. Further, since the process is chiefly based on the ring-opening addition reaction of an aziridine ring onto the amino group of a polyaminoamide, involvement of by-production of sulfur-containing compounds having an offensive odor is reduced. Therefore, the process is very useful for introduction of a mercapto group into a polyaminoamide. Since the resulting modified polyaminoamide is applicable as such as an epoxy resin curing agent, a modified polyaminoamide can be produced with no need of treatment of waste, waste water, etc., which leads to great advantages from the standpoint of both environmental protection and industrial efficiency.

While the invention has been described in detail and with reference to specific examples thereof, it will be apparent to one skilled in the art that various changes and modifications can be made therein without departing from the spirit and scope thereof.

Japanese applications HEI 5-203401 and HEI 5-203402 both filed on Aug. 17, 1993 are herein incorporated by reference.

What is claimed is:

1. A process for producing a modified polyaminoamide, comprising the step of:

reacting a polyaminoamide having at least one amide group and a plurality of amino groups per molecule, an aziridine compound represented formula (I):

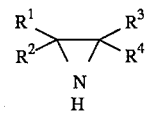  (I)

wherein $R^1$, $R^2$, $R^3$, and $R^4$ which may be the same or different, each represent a hydrogen atom or an alkyl group having from 1 to 4 carbon atoms, and a thiirane compound represented by formula (II):

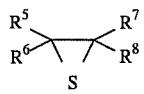  (II)

wherein $R^5$, $R^6$, $R^7$, and $R^8$ which may be the same or different, each represent a hydrogen atom, an alkyl group having from 1 to 4 carbon atoms or an aryl group.

2. A process for producing a modified polyaminoamide, comprising the step of:

reacting a polyaminoamide having at least one amide group and a plurality of amino groups per molecule, with a 1-(2-mercaptoethyl)aziridine compound represented by formula (III):

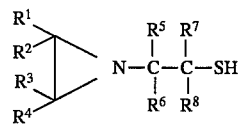  (III)

wherein $R^1$, $R^2$, $R^3$, and $R^4$, which may be the same or different, each represent a hydrogen atom or an alkyl group having from 1 to 4 carbon atoms; and $R^5$, $R^6$, $R^7$, and $R^8$, which may be the same or different, each represent a hydrogen atom, an alkyl group having from 1 to 4 carbon atoms or an aryl group.

3. A process as claimed in claim 2, wherein said 1-(2-mercaptoethyl)aziridine compound is 1-(2-mercaptoethyl)aziridine.

4. A process as claimed in claim 1, wherein said reacting is carried out by first reacting said aziridine compound and said thiirane compound to obtain a reaction product (A) and then reacting said reaction product (A) with said polyaminoamide.

5. A process as claimed in claim 1, wherein said reacting is carried out by putting said polyaminoamide in a reaction vessel, and adding thereto said aziridine compound and said thiirane compound.

6. A process as claimed in claim 4, wherein said aziridine compound is aziridine, and said thiirane compound is thiirane.

7. A process as claimed in claim 5, wherein said aziridine compound is aziridine, and said thiirane compound is thiirane.

8. A modified polyaminoamide obtained by a process comprising the step of:

reacting a polyaminoamide having at least one amide group and a plurality of amino groups per molecule, an aziridine compound represented by formula (I):

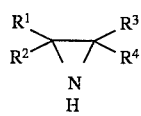  (I)

wherein $R^1$, $R^2$, $R^3$, and $R^4$, which may be the same or different, each represent a hydrogen atom or an alkyl group having from 1 to 4 carbon atoms, and a thiirane compound represented by formula (II):

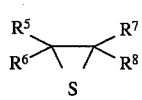  (II)

wherein $R^5$, $R^6$, $R^7$, and $R^8$, which may be the same or different, each represent a hydrogen atom, an alkyl group having from 1 to 4 carbon atoms or an aryl group.

9. A modified polyaminoamide obtained by a process comprising the step of:

reacting a polyaminoamide having at least one amide group and a plurality of amino groups per molecule, with a 1-(2-mercaptoethyl)aziridine compound represented by formula (III):

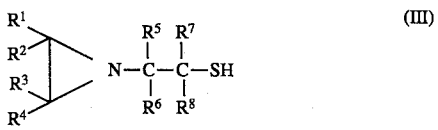

wherein $R^1$, $R^2$, $R^3$, and $R^4$, which may be the same or different, each represent a hydrogen atom or an alkyl group having from 1 to 4 carbon atoms; and $R^5$, $R^6$, $R^7$, and $R^8$, which may by the same or different, each represent a hydrogen atom, an alkyl group having from 1 to 4 carbon atoms or an aryl group.

10. An epoxy resin composition containing a curing agent, comprising an epoxy resin; and 0.1–2000 parts by weight per 100 parts by weight of said epoxy resin of a modified polyaminoamide obtained by a process comprising reacting a polyaminoamide having at least one amide group and a plurality of amino groups per molecule, an aziridine compound represented by formula (I):

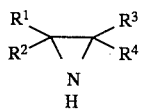

wherein $R^1$, $R^2$, $R^3$, and $R^4$, which may be the same or different, each represent a hydrogen atom or an alkyl group having from 1 to 4 carbon atoms, and a thiirane compound represented by formula (II):

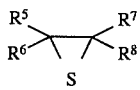

wherein $R^5$, $R^6$, $R^7$, and $R^8$, which may be the same or different, each represent a hydrogen atom, an alkyl group having from 1 to 4 carbon atoms or an aryl group.

11. An epoxy resin composition containing a curing agent, comprising an epoxy resin; and 0.1–2000 parts by weight per 100 parts by weight of said epoxy resin of a modified polyaminoamide obtained by a process comprising reacting a polyaminoamide having at least one amide group and a plurality of amino groups per molecule with a 1-(2-mercaptoethyl)aziridine compound represented by formula (III):

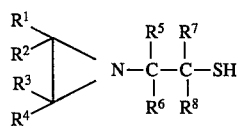

wherein $R^1$, $R^2$, $R^3$, and $R^4$, which may be the same or different, each represent a hydrogen atom or an alkyl group having from 1 to 4 carbon atoms; and $R^5$, $R^6$, $R^7$, and $R^8$, which may be the same or different, each represent a hydrogen atom, an alkyl group having from 1 to 4 carbon atoms or an aryl group.

12. A process as claimed in claim 4, wherein said reaction product (A) has a number average molecular weight of 103–300.

13. A process as claimed in claim 4, wherein said aziridine compound and said thiirane compound are reacted in an equimolar ratio.

14. A process as claimed in claim 1, wherein 0.1–10 molar equivalents of said aziridine compound and 0.1–10 molar equivalents of said thiirane compound are reacted with said polyaminoamide.

15. A process as claimed in claim 1, wherein said modified polyaminoamide has a number average molecular weight of 200–100,000.

16. A process as claimed in claim 1, wherein said polyaminoamide comprises a first portion and a second portion, and wherein said reacting is carried out by putting said first portion of said polyaminoamide in a reaction vessel, and adding thereto said second portion of said polyaminoamide, said aziridine compound and said thiirane compound.

17. A process as claimed in claim 2, wherein said reacting is carried out in the presence of an acid catalyst.

18. An epoxy resin composition as claimed in claim 10, comprising 1–300 parts by weight of said modified polyaminoamide per 100 parts by weight of said epoxy resin.

19. An epoxy resin composition as claimed in claim 11, comprising 1–300 parts by weight of said modified polyaminoamide per 100 parts by weight of said epoxy resin.

20. An epoxy resin composition as claimed in claim 10, further comprising a Lewis base.

21. An epoxy resin composition as claimed in claim 11, further comprising a Lewis base.

* * * * *